(12) United States Patent
Choi et al.

(10) Patent No.: US 10,139,853 B2
(45) Date of Patent: Nov. 27, 2018

(54) METHOD FOR MANUFACTURING LIGHT EMITTING METAL KNOB

(71) Applicant: Jaeho Choi, Changwon-si, Gyeongsangnam-do (KR)

(72) Inventors: Jaeho Choi, Changwon-si (KR); Sanghwa Harrison Kim, Morgan Hill, CA (US)

(73) Assignee: Jaeho Choi (KR)

( * ) Notice: Subject to any disclaimer, the term of this patent is extended or adjusted under 35 U.S.C. 154(b) by 0 days.

(21) Appl. No.: 15/800,716

(22) Filed: Nov. 1, 2017

(65) Prior Publication Data

US 2018/0210486 A1 Jul. 26, 2018

Related U.S. Application Data

(63) Continuation of application No. PCT/KR2017/011185, filed on Oct. 11, 2017.

(30) Foreign Application Priority Data

Jan. 20, 2017 (KR) ........................ 10-2017-0009532

(51) Int. Cl.
*H01H 11/00* (2006.01)
*G05G 25/00* (2006.01)
(Continued)

(52) U.S. Cl.
CPC ............ *G05G 25/00* (2013.01); *B29C 45/006* (2013.01); *B29C 45/14221* (2013.01); *B29C 45/1671* (2013.01); *C25D 11/02* (2013.01); *G05G 1/02* (2013.01); *H01H 11/00* (2013.01); *B29C 2045/1693* (2013.01); *B29C 2793/009* (2013.01); *B29C 2793/0027* (2013.01); *B29K 2705/00* (2013.01); *B29K 2995/0026* (2013.01); *B29L 2031/747* (2013.01)

(58) Field of Classification Search
CPC ........ G05G 25/00; G05G 1/02; B29C 45/006; C25D 11/02; B29L 2031/747
See application file for complete search history.

(56) References Cited

U.S. PATENT DOCUMENTS

| | | | |
|---|---|---|---|
| 6,905,777 B2 * | 6/2005 | Near ...................... | B32B 15/04 428/469 |
| 9,416,942 B2 * | 8/2016 | Choi ...................... | F21V 11/00 |
| 9,443,676 B2 * | 9/2016 | Na ......................... | H01H 13/14 |

FOREIGN PATENT DOCUMENTS

| KR | 10-1210906 B1 | 12/2012 |
|---|---|---|
| KR | 10-1370256 B1 | 3/2014 |

(Continued)

*Primary Examiner* — Richard Chang
(74) *Attorney, Agent, or Firm* — Park & Associates IP Law, P.C.

(57) ABSTRACT

The present invention relates to a method for manufacturing a light emitting knob based on a novel process that is capable of preventing a letter that is separated from a light blocking metal plate at a display window forming step from being separated from a resin layer irrespective of the shape or the type of the letter, which constitutes a light emitting display window, thereby considerably reducing a defect rate, and in particular, to provide a method for manufacturing a light emitting metal knob that introduces a new process so as to realize a surface color through anodizing processing from letters separated from a light blocking metal plate.

9 Claims, 14 Drawing Sheets

(51) Int. Cl.
*C25D 11/02* (2006.01)
*G05G 1/02* (2006.01)
*B29C 45/00* (2006.01)
*B29C 45/14* (2006.01)
*B29C 45/16* (2006.01)
B29L 31/00 (2006.01)
B29K 705/00 (2006.01)

(56) References Cited

FOREIGN PATENT DOCUMENTS

| | | |
|---|---|---|
| KR | 10-1412781 B1 | 7/2014 |
| KR | 10-1560998 B1 | 10/2015 |
| KR | 10-1560999 B1 | 10/2015 |

* cited by examiner

METHOD FOR MANUFACTURING LIGHT EMITTING METAL KNOB

REFERENCE TO RELATED APPLICATIONS

This is a continuation of International Patent Application PCT/KR2017/011185 filed on Oct. 11, 2017, which designates the United States and claims priority of Korean Patent Application No. 10-2017-0009532 filed on Jan. 20, 2017, the entire contents of which are incorporated herein by reference.

FIELD OF THE INVENTION

The present invention relates to a method for manufacturing a light emitting metal knob that emits light emitted from a light emitting device outward through a letter or symbol type light emitting display window, thereby improving visibility.

BACKGROUND OF THE INVENTION

In general, a knob, which has the same dictionary definition as a protruding handle, is a button that is configured to display or control a vehicle or an electronic product. Knobs may have various shapes, structures, and functions. For example, knobs are classified into a display type knob, such as a change knob of a transmission gear of a vehicle, a push type knob, such as a start button of a vehicle, or a rotary type knob, such as a volume adjustment knob of an audio system.

Conventionally, a synthetic resin was simply molded in order to manufacture the knob. In recent years, knobs having luxurious and aesthetically pleasing appearances have been proposed with increasing interest in the design of knobs. For example, a light emitting adjustment knob is disclosed in Korean Registered Patent Publication No. 10-1210906. As shown in FIGS. 1 and 2, a light emitting metal knob 1 includes a light blocking metal plate 10 having a light emitting display window 11 and a resin layer 20, made of a light transmitting synthetic resin, coupled to the lower surface of the light blocking metal plate 10.

The resin layer 20 is coupled to the lower part of the light blocking metal plate 10 by bonding or by insert injection molding. In addition, referring to FIG. 2, a light emitting device 30 is installed under the resin layer 20 to display a predetermined message, such as "ENGINE START STOP," outward through the light emitting display window 11 of the light blocking metal plate 10 in a light emitting fashion.

A method for manufacturing the conventional light emitting metal knob as described above will be described with reference to FIGS. 3 and 4. The method for manufacturing the conventional light emitting metal knob includes a metal plate processing step (S10) of processing a light blocking metal plate 10 such that the upper part of the light blocking metal plate is closed and the lower part of the light blocking metal plate is open, a resin layer coupling step (S20) of coupling a resin layer 20, which is made of a light transmitting synthetic resin, to the inner side of the lower part of the light blocking metal plate 10, a display window forming step (S30) of forming a light emitting display window 11 in the upper surface of the light blocking metal plate 10 by carving, a surface treatment step (S40) of treating the upper surface of the light blocking metal plate 10, in which the light emitting display window 11 is formed, and a coating step (S50) of coating the treated upper surface of the light blocking metal plate 10.

In the method for manufacturing the conventional light emitting metal knob, as shown in FIG. 5, letters, such as E, N, G, I, N, S, and T, the start and the end of a cutoff line of each of which are attached to the light blocking metal plate 10, of "ENGINE START STOP," which is the message, displayed through the light emitting display window 11, which is widely used, are not separated from the resin layer 20. However, the inner portions of letters, such as A, R, O, and P, which are separated from the light blocking metal plate 10 with the result that only the bottom surfaces of the letters are attached to the resin layer 20, i.e. "Δ" of A, "D" of R and P, and "O" of O, are easily separated from the resin layer 20 when the light emitting display window 11 is formed by carving at the display window forming step (S30) and when the upper surface of the light blocking metal plate 10 is treated at the surface treatment step (S40), whereby a defect rate is increased.

In order to solve such a problem, the present applicant filed and registered a 'method for manufacturing a light emitting knob' in each of Korean Patent Registrations Nos. 10-1560998 and 10-1560999, thereby bringing about an effect of significantly reducing the defect rate.

But recently, anodizing treatment is required to realize a surface color of the light blocking metal plate 10 in order to provide a more aesthetic effect. However, according to the above-described related art, it is inevitable that the letters which are island parts are separated independently after forming the light emitting display window 11 by plane-cutting the upper surface of the light blocking metal plate 10. Therefore, in the anodizing process, the island parts are separated from the light blocking metal plate 10 without being connected to the metal, so that only the island parts cannot be realized color.

SUMMARY OF THE INVENTION

The present invention has been made to solve the above problems, and it is an object of the present invention to provide a method for manufacturing a light emitting metal knob based on a novel process that is capable of preventing a letter that is separated from a light blocking metal plate at a display window forming step from being separated from a resin layer irrespective of the shape or the type of the letter, which constitutes a light emitting display window, thereby considerably reducing a defect rate.

And in particular, to provide a method for manufacturing a light emitting metal knob that introduces a new process so as to realize a surface color through anodizing processing from letters separated from a light blocking metal plate.

Other objects, specific advantages, and novel features of the present invention will become apparent from the following description of embodiments given in conjunction with the accompanying drawing.

In order to accomplish the above objects, a method for manufacturing a light emitting metal knob according to the present invention includes a metal plate processing step of processing a light blocking metal plate such that an upper part of the light blocking metal plate is closed and a lower part of the light blocking metal plate is open; a display groove forming step of forming a light emitting display groove in an upper surface of the light blocking metal plate; a first resin layer coupling step of coupling a first resin layer, which is made of a light transmitting synthetic resin, to the upper surface of the light blocking metal plate so as to fill the light emitting display groove; an upper surface plane-cutting step of cutting the upper surface of the light blocking metal plate planarly so that the first resin layer filled in the light emitting display groove is left; an anodizing step of applying an anodic oxidation treatment to the surface of the light blocking metal plate and then absorbing an organic dye to realize color; a lower surface plane-cutting step of cutting a lower surface of the light blocking metal plate planarly such that the first resin layer coupled into the light emitting display groove is exposed from the lower surface of the light blocking metal plate to form a light emitting display window; and a second resin layer coupling step of coupling a second resin layer, which is made of a light transmitting synthetic resin, to the lower surface of the light blocking metal plate.

In addition, the metal plate processing step may include processing a plate-shaped metal material by pressing to manufacture the light blocking metal plate.

In addition, the method according to the present invention may further include a surface treatment step performing between the display groove forming step and the first resin layer coupling step, to surface-treat the light blocking metal plate to increase a coupling force of the first resin layer to the light blocking metal plate.

In addition, the surface treatment step may include treating a surface of the light blocking metal plate to increase the oxygen content to form an oxygen-containing film containing oxygen; and the first resin layer coupling step may include the first resin layer contains an additive compound having a functional group that reacts with the oxygen-containing film as a thermoplastic resin composition, wherein the additive compound is selected from the group consisting of a carboxyl group, a salt thereof and ester thereof, an epoxy group, a glycidyl group, an isocyanate group, a carbodiimide group, an amino group and a salt thereof, an acid anhydride group and an ester thereof.

In addition, the method according to the present invention may further include a sandblasting step performing between the upper surface plane-cutting step and the anodizing step, to sandblast a surface of the light blocking metal plate to make the surface clean.

In addition, the first resin layer coupling step may include the first resin layer is bonded to the upper surface of the light blocking metal plate or the first resin layer is insert injection molded by using the light blocking metal plate as an insert.

In addition, the second resin layer coupling step may include the second resin layer is bonded to the lower surface of the light blocking metal plate or the first resin layer is insert injection molded by using the light blocking metal plate as an insert.

In addition, the method according to the present invention may further include a coating step of coating the upper surface of the light blocking metal plate.

In addition, the coating step may include coating the upper surface of the light blocking metal plate with hard urethane.

The method for manufacturing the light emitting metal knob according to the present invention has the following effects.

First, the light emitting display groove is formed on the upper surface of the light blocking metal plate at the display groove forming step, and then the first resin layer is filled in the light emitting display groove at the first resin layer coupling step and the upper surface plane-cutting step, the letters to be separated from the light blocking metal plate is maintained in a state where the lower surface and the side surface are firmly coupled by the first resin layer and the second resing layer through the lower surface plane-cutting step and the second resin layer coupling step, thereby considerably reducing a defect rate.

Second, the first resin layer is coupled to the light emitting display groove through the upper surface plane-cutting step after the display groove forming step and the first resin layer coupling step, since the metal connection between the light blocking metal plate and the letters to be separated is maintained, thereby the color of the surface can be realized even the letters to be separated from the light blocking metal plate when the anodizing processing.

Third, an oxygen-containing film is formed on the surface of the light blocking metal plate through the surface treatment step and an additive compound having a functional group reactive with the oxygen-containing film is contained in the first resin layer at the first resin layer coupling step, thereby a strong coupling force between the two dissimilar materials can be obtained and there is an effect of preventing the first resin layer from being separated from the light blocking metal plate together with the letters to be separated.

DETAILED DESCRIPTION OF THE INVENTION

Hereinafter, an exemplary embodiment of a method for manufacturing a light emitting metal knob according to the present invention will be described in detail with reference to the accompanying drawings.

Figure 12:
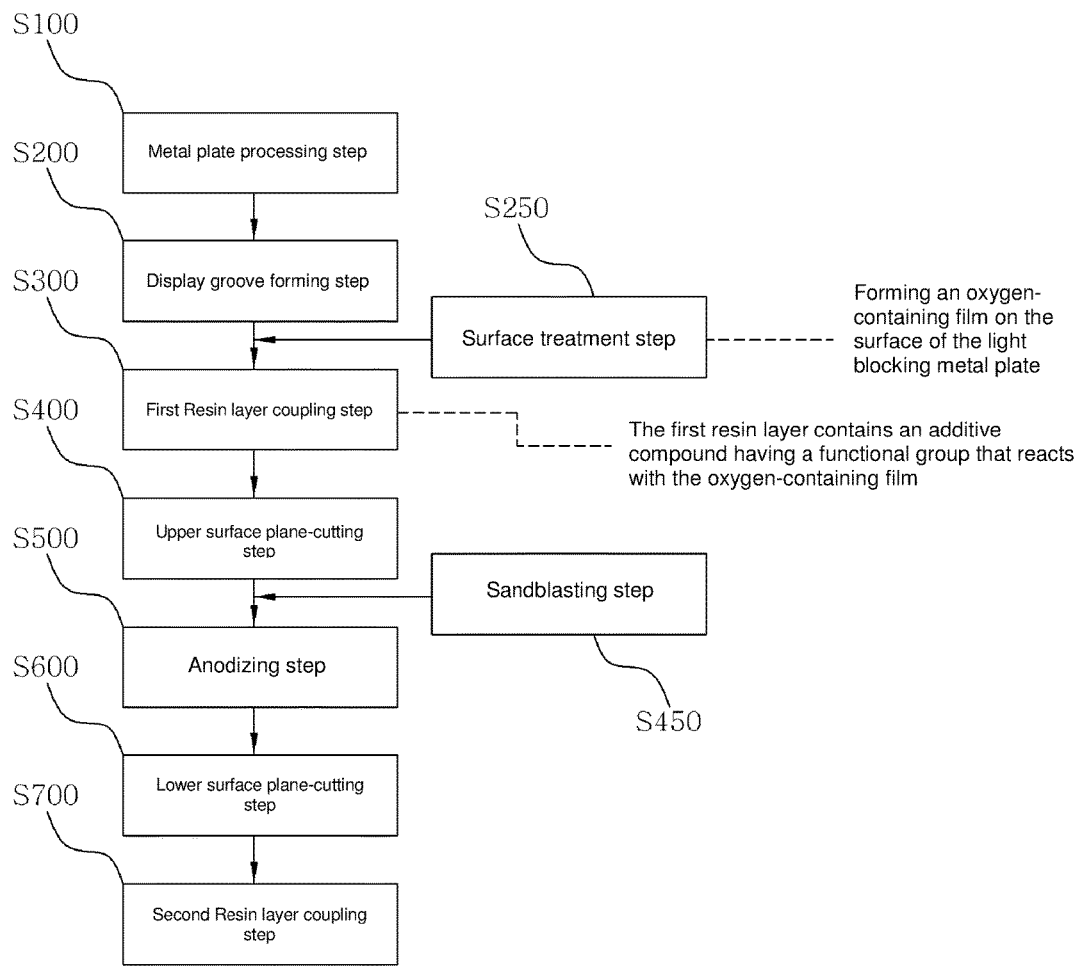
FIG. 12 is a flowchart showing a second embodiment of a method for manufacturing a light emitting metal knob according to the present invention.
Figure 13:
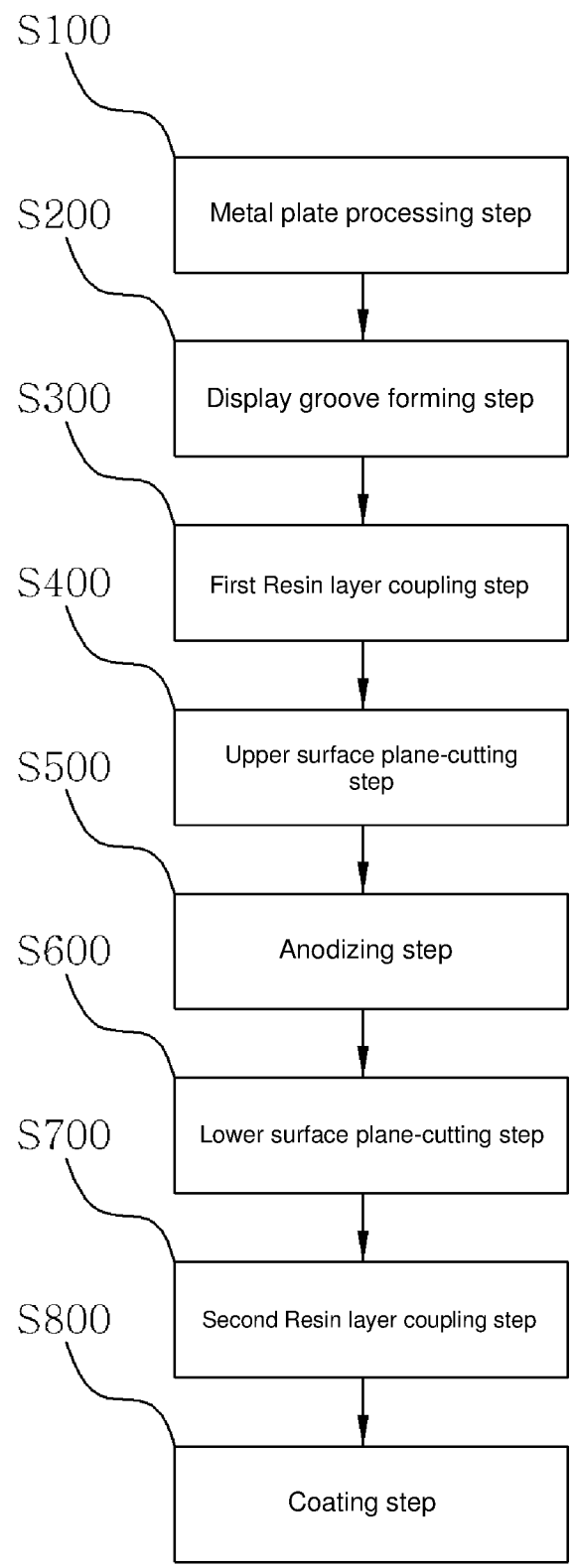
FIG. 13 is a flowchart showing a third embodiment of a method for manufacturing a light emitting metal knob according to the present invention.

As shown in FIGS. 6 to 11, the method for manufacturing the light emitting knob according to the present invention may include a metal plate processing step (S100), a display groove forming step (S200), a first resin layer coupling step (S300), an upper surface plane-cutting step (S400), an anodizing step (S500), and a lower surface plane-cutting step (S600). As shown in FIG. 12, the method for manufacturing the light emitting metal knob according to the present invention may further include a surface treatment step (S250) and a sandblasting step (S450). As shown in FIG. 13, the method for manufacturing the light emitting metal knob according to the present invention may further include a coating step (S800).

Figure 1:
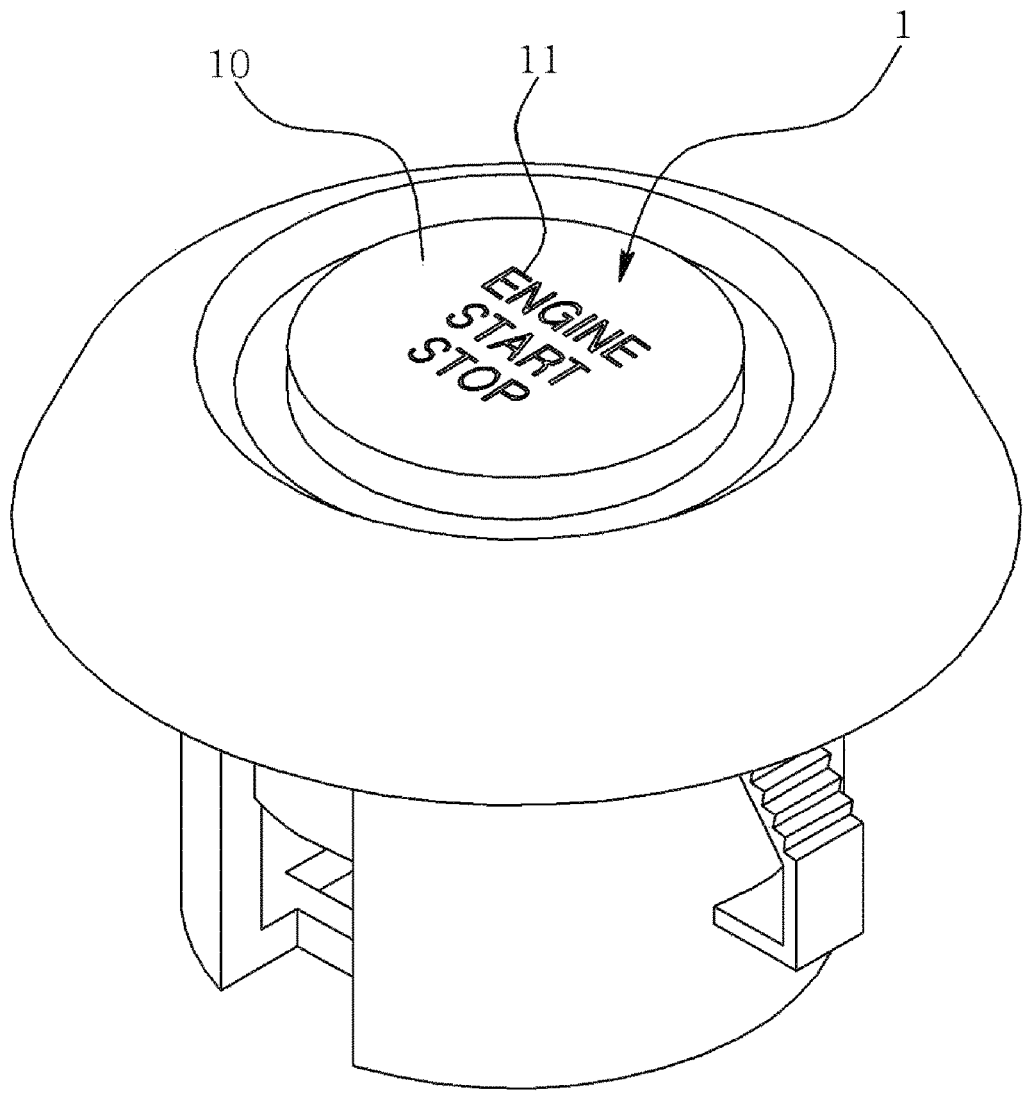
FIG. 1 is a perspective view showing a general light emitting metal knob.
Figure 2:
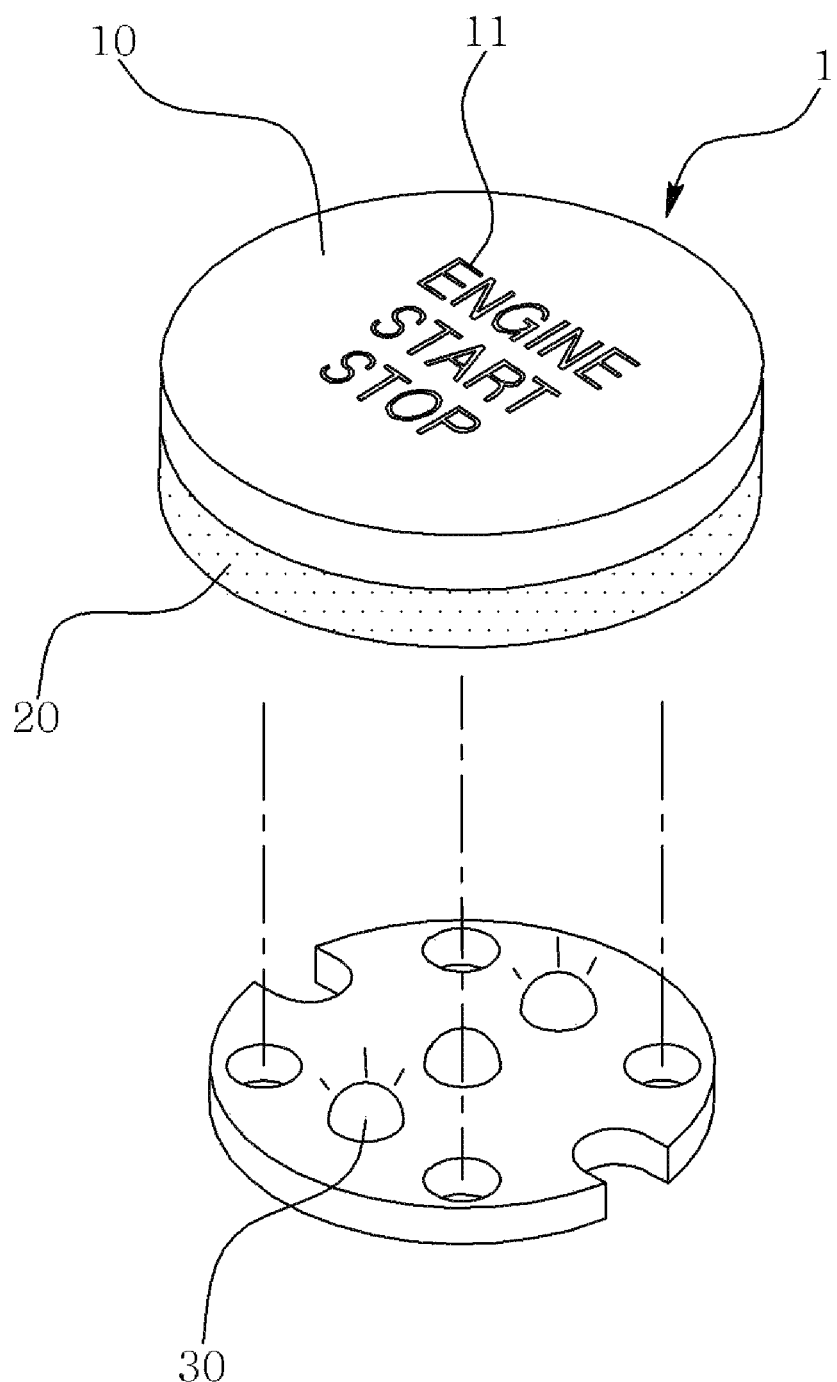
FIG. 2 is an exploded perspective view of the light emitting metal knob in the embodiment shown in FIG. 1.
Figure 3:
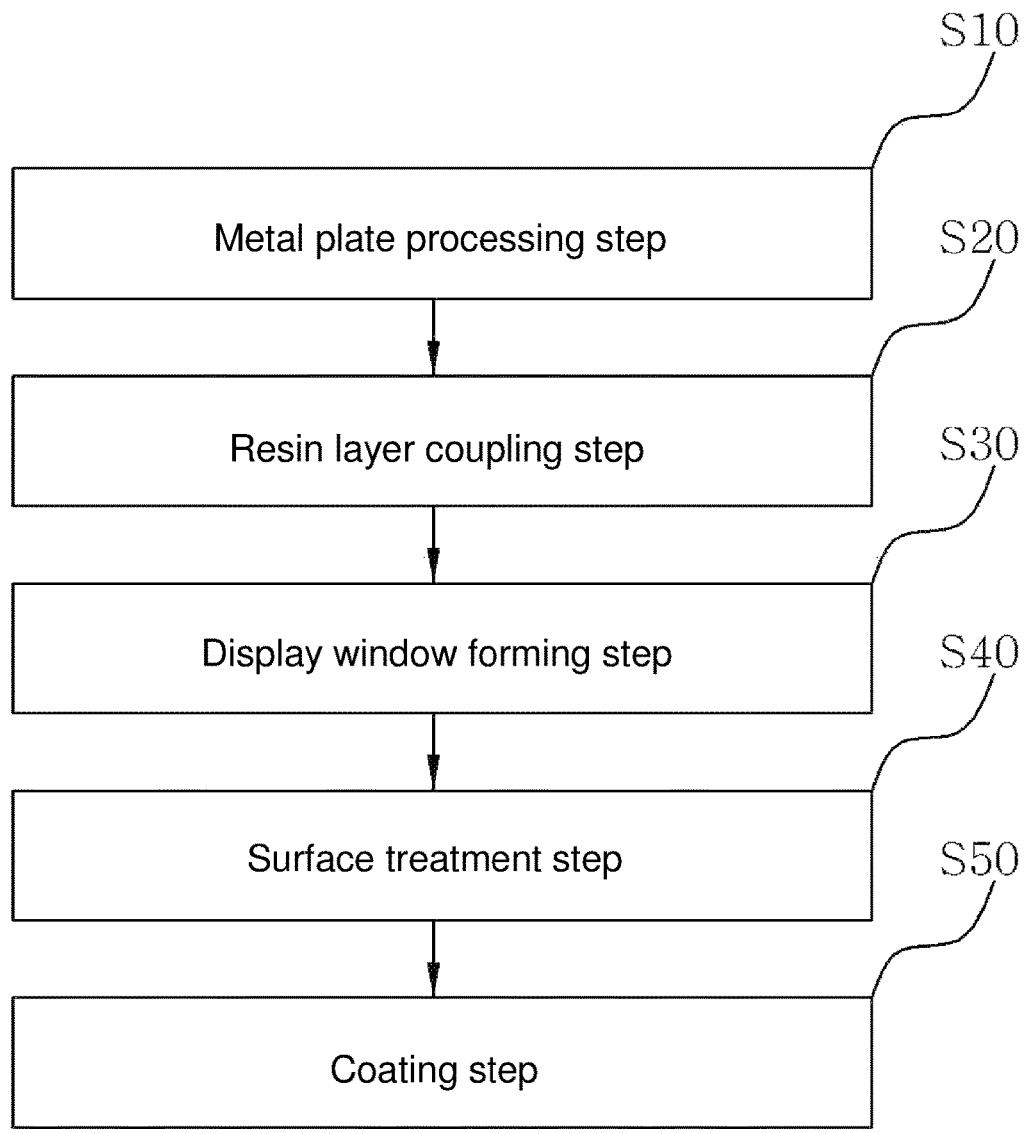
FIG. 3 is a flowchart showing a method for manufacturing a conventional light emitting metal knob.
Figure 4:
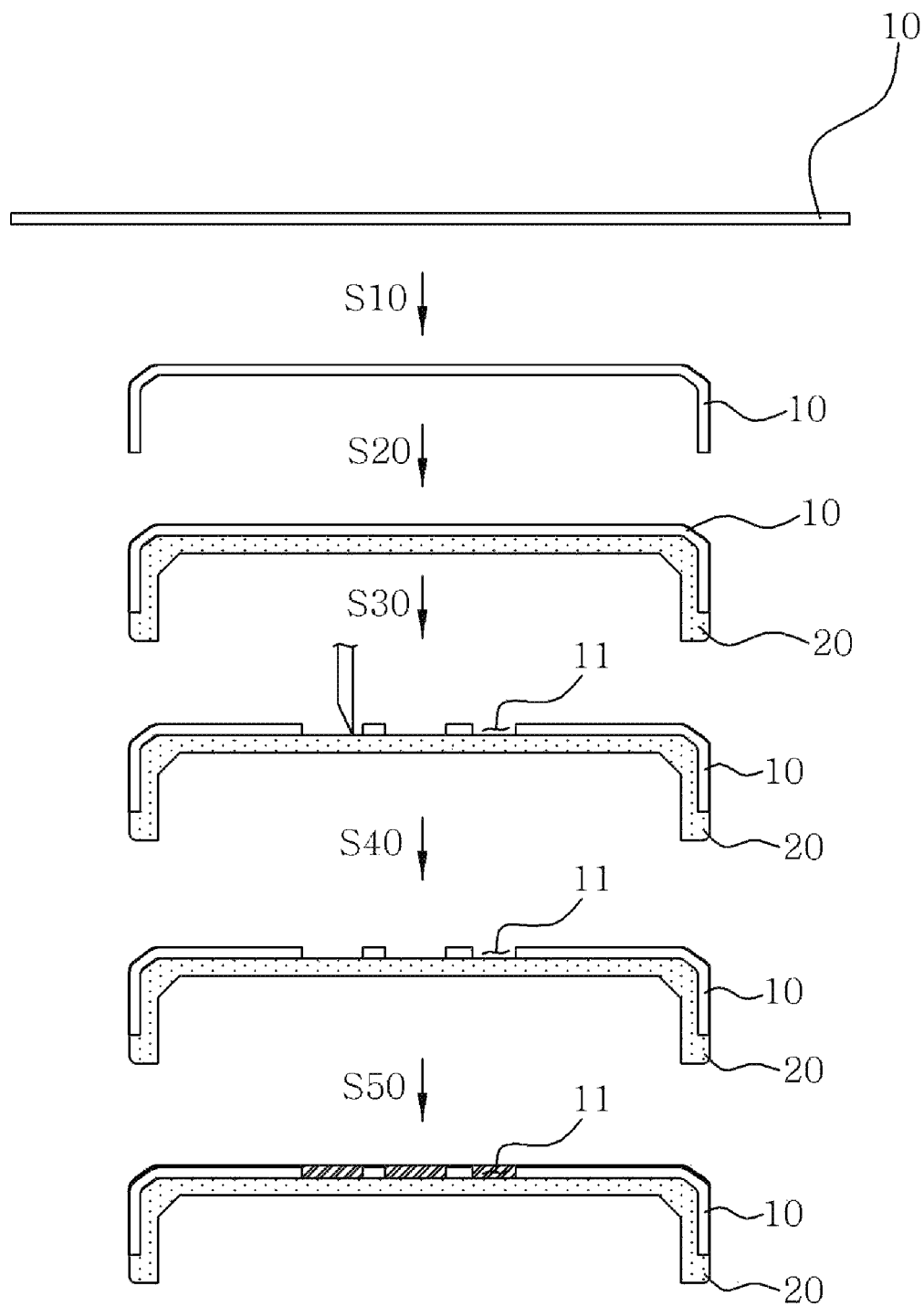
FIG. 4 is a side sectional view showing, step by step, a process for manufacturing a light emitting metal knob in accordance with the flowchart of the embodiment shown in FIG. 3.
Figure 5:
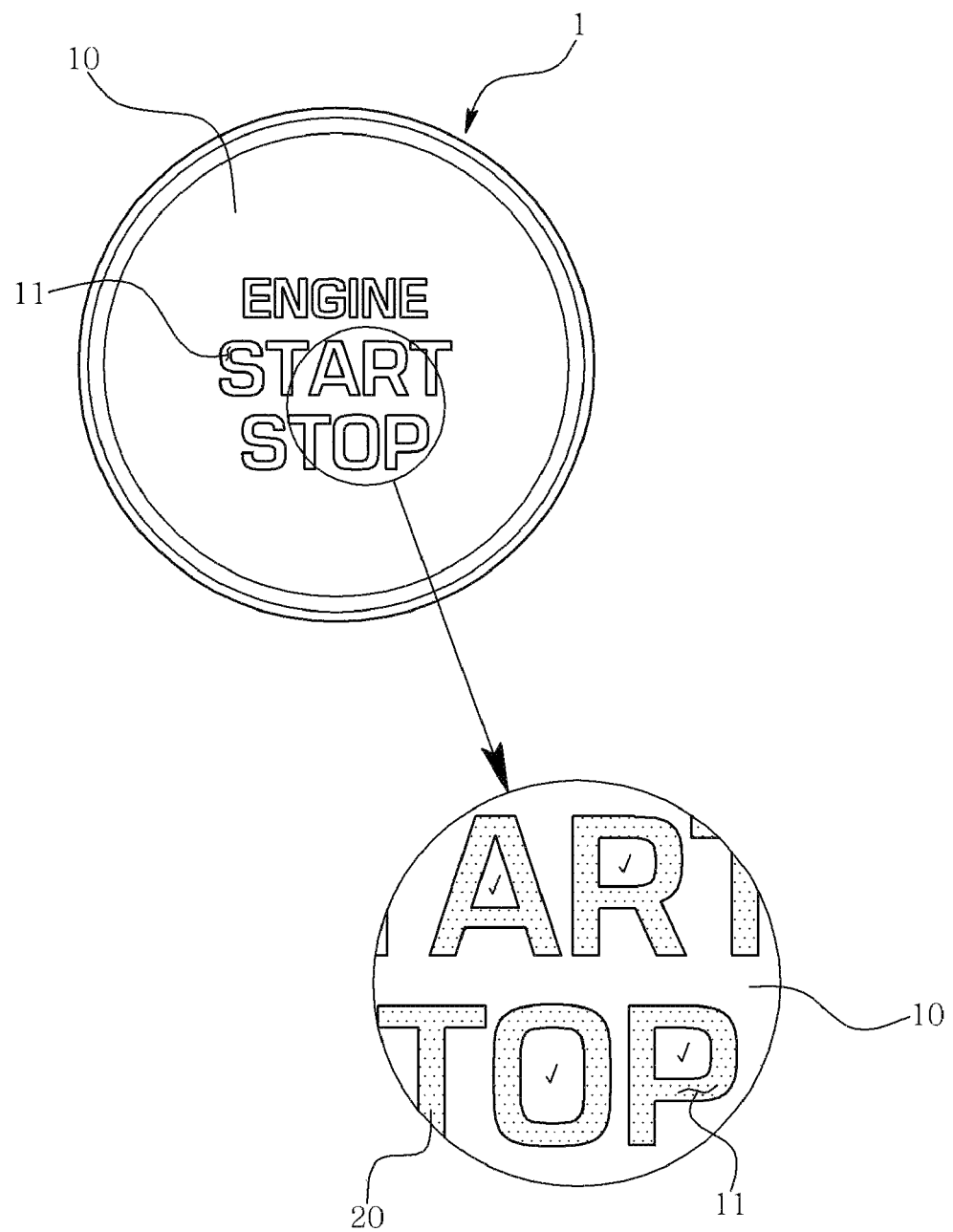
FIG. 5 is a front view showing a light emitting metal knob that is manufactured in accordance with the embodiment shown in FIGS. 3 and 4.
Figure 6:
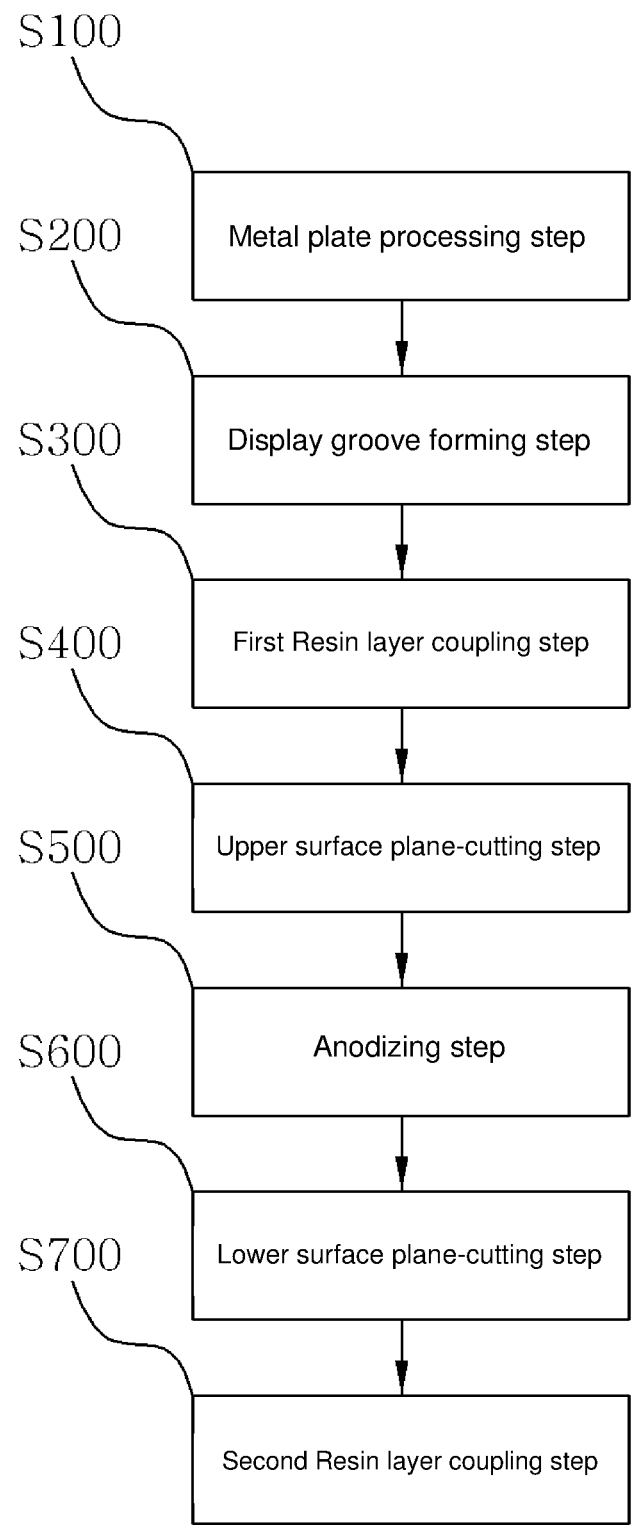
FIG. 6 is a flowchart showing a first embodiment of a method for manufacturing a light emitting metal knob according to the present invention.
Figure 7:
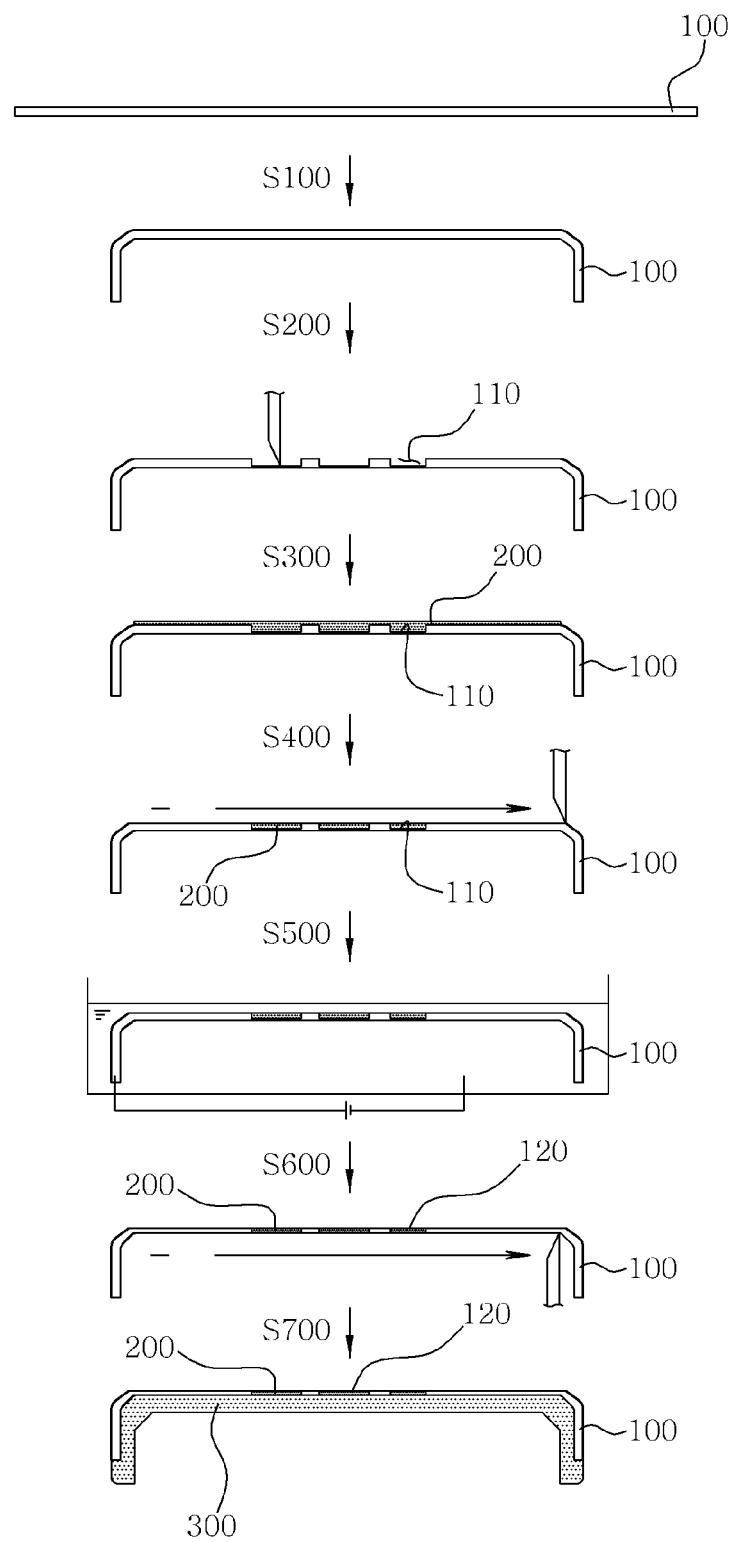
FIG. 7 is a side sectional view showing a process for manufacturing a light emitting metal knob per step in accordance with the flowchart of the embodiment shown in FIG. 6.

At the metal plate processing step (S100), as shown in FIGS. 6 and 7, a light blocking metal plate 100 is processed such that the upper part of the light blocking metal plate 100 is closed and the lower part of the light blocking metal plate 100 is open. The light blocking metal plate 100 is made of a plate-shaped metal material. As compared with a conventional synthetic resin, the light blocking metal plate 100 has an aesthetically pleasing appearance due to the luxurious characteristics of metal. The light blocking metal plate 100 has various shapes based on the function and type of the light emitting metal knob 1. As shown in FIG. 2, the upper part of the light blocking metal plate 100 is closed and the lower part of the light blocking metal plate 100 is open such that the light blocking metal plate 100 blocks light from the light emitting device 30, which emits light under the light blocking metal plate 100, and such that the lower part of the light blocking metal plate 100 is coupled to the light emitting device 30. The light blocking metal plate 100 may be processed using various processing methods, such as cutting, casting, and injection molding, such that the upper part of the light blocking metal plate 100 is closed and the lower part of the light blocking metal plate 100 is open. As shown in FIG. 7, however, a plate-shaped metal material may be processed by pressing to manufacture the light blocking metal plate 100, which is most suitable for mass production, considering that the light blocking metal plate 100 is made of a plate-shaped material.

Figure 8:
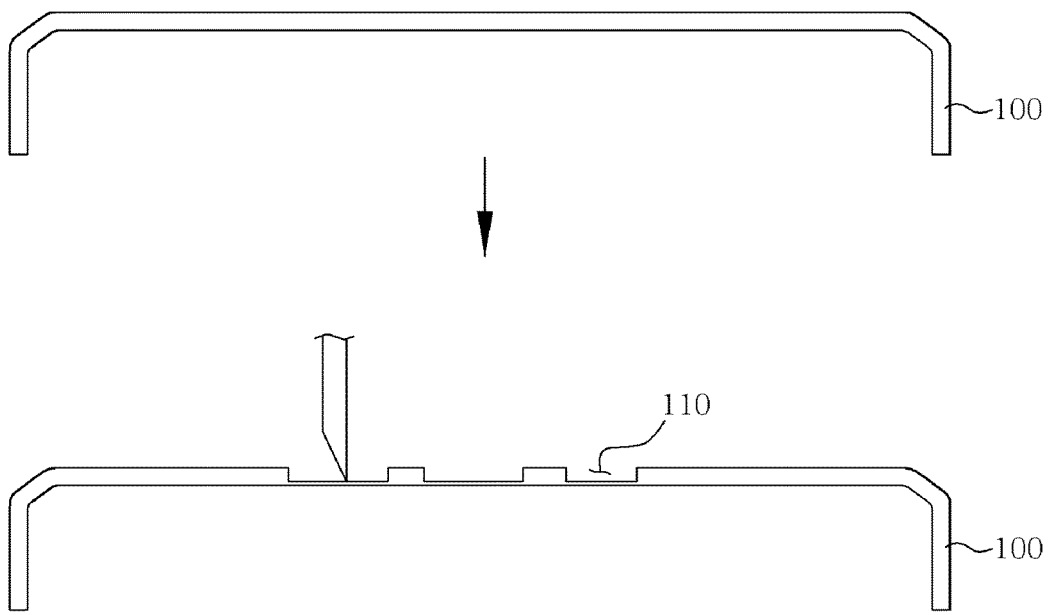
FIG. 8 is a side sectional view of a principal part showing a process for manufacturing a light emitting metal knob at a display groove forming step in the embodiment shown in FIG. 7.

At the display groove forming step (S200), as shown in FIGS. 6 to 8, a light emitting display groove 110 is formed in the upper surface of the light blocking metal plate 100. In a case in which the light blocking metal plate 100 is configured such that the upper part of the light blocking metal plate 100 is closed and the lower part of the light blocking metal plate 100 is open, as shown in FIGS. 6 to 8, the light blocking metal plate 100 has a '[' shape, in which the lower part of the light blocking metal plate 100 is open when viewed in side section. The light emitting display groove 110 is formed in the exposed upper surface of the light blocking metal plate 100 such that the light emitting display groove 110 has the same shape as a letter or a symbol of a light emitting display window 120, which will be described hereinafter. As shown in FIGS. 7 and 8, carving may be used to form the light emitting display groove 110 in the upper surface of the light blocking metal plate 100. Alternatively, various other processing methods, such as pressing, punching, and chemical hatching, may be used to form the light emitting display groove 110 in the upper surface of the light blocking metal plate 100. Any processing methods may be used as long as, at the display groove forming step (S200), the light emitting display groove 110 is formed in the upper surface of the light blocking metal plate 100 such that the light emitting display groove 110 has the same shape as the light emitting display window 120, which will be described hereinafter.

Meanwhile, it may seem that the display groove forming step (S200) is carried out after the metal plate processing step (S100) considering the order of the reference symbols or the sequence of the flowchart shown in the drawings. However, the sequence in which the metal plate processing step (S100) and the display groove forming step (S200) are carried out is not particularly restricted. That is, at the display groove forming step (S200), the light emitting display groove 110 may be formed in advance in a portion of the plate-shaped metal material which will become the upper surface of the light blocking metal plate 100 at the metal plate processing step (S100), and then the metal plate processing step (S100) may be carried out. Alternatively, the metal plate processing step (S100) and the display groove forming step (S200) may be simultaneously carried out such that the light blocking metal plate 100 is processed by pressing simultaneously when the light emitting display groove 110 is formed.

At the first resin layer coupling step (S300), as shown in FIGS. 6 and 7, a first resin layer 200, which is made of a light transmitting synthetic resin, is coupled to the upper surface of the light blocking metal plate 100 so as to fill the light emitting display groove 110. Since the first resin layer 200 is made of a light transmitting synthetic resin, light emitted from the light emitting device 30 may be transmitted through the first resin layer 200 such that the light reaches the light blocking metal plate 100. In a case in which the first resin layer 200 is coupled to the upper surface of the light blocking metal plate 100, the first resin layer 200 may be manufactured in advance so as to have a shape in which the first resin layer 200 can be inserted into and fitted in the light blocking metal plate 100, and may then be coupled to the light blocking metal plate 100 by bonding. Alternatively, the first resin layer 200 may be formed by insert injection molding using the light blocking metal plate 100 as an insert such that the light blocking metal plate 100 is coupled to the first resin layer 200.

Figure 9:
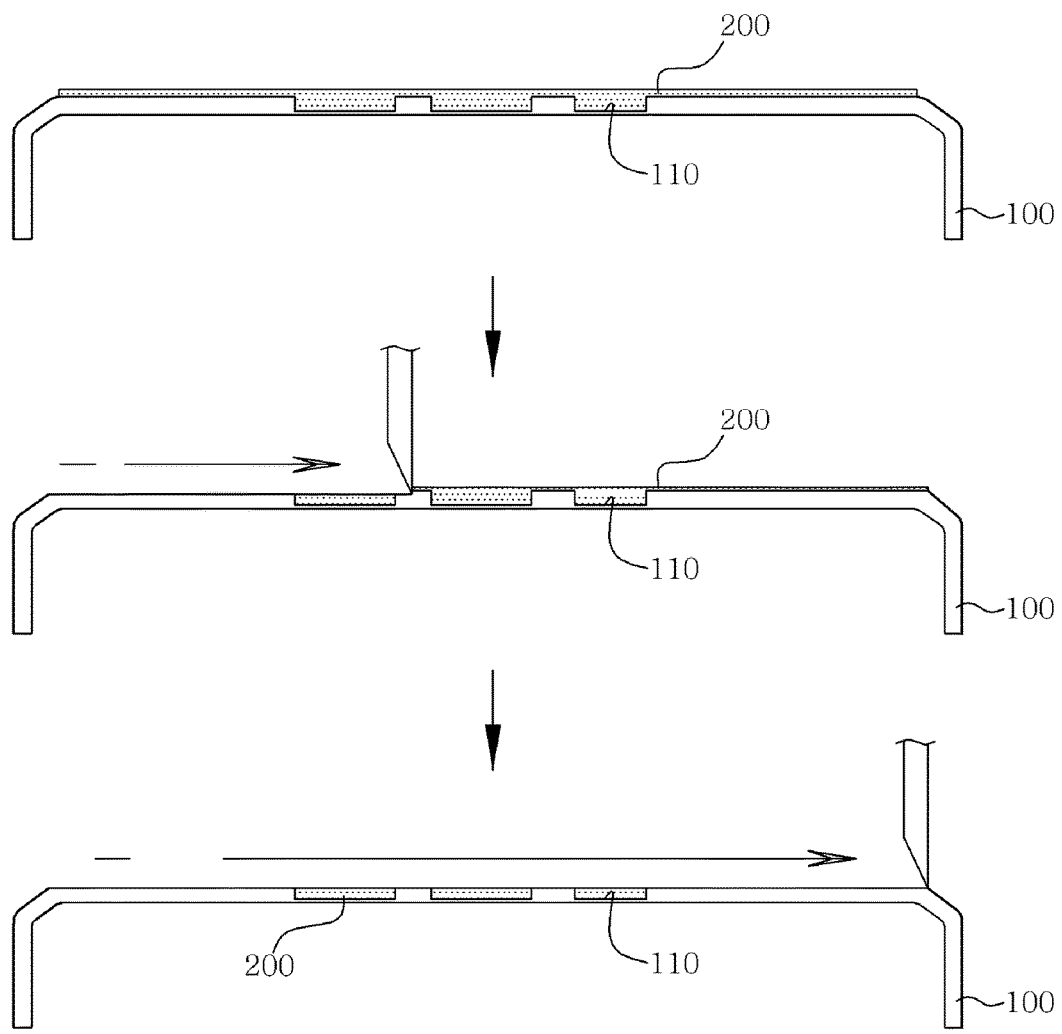
FIG. 9 is a side sectional view of a principal part showing a process for manufacturing a light emitting metal knob at a upper surface plane-cutting step in the embodiment shown in FIG. 7.

At the upper surface plane-cutting step (S400), as shown in FIGS. 6, 7, and 9, the upper surface of the light blocking metal plate 100 is cut planarly so that the first resin layer 200 filled in the light emitting display groove 110 is left. The first resin layer 200 is coupled to the entire upper surface of the light blocking metal plate 100 in the first resin layer coupling step (S300). The upper surface of the light blocking metal plate 100 excluding the light emitting display groove 110 is cut planarly so that the exposed upper surface becomes a metal surface through the upper surface plane-cutting step (S400). Therefore, when the upper surface of the light blocking metal plate 100 is cut planarly, the first resin layer 200 filled in the light emitting display groove 110 as well as the letters to be separated is firmly coupled to the first resin layer 200. In particular, the metal connection between the light blocking metal plate 100 and the letters to be separated is maintained.

At the anodizing step (S500), as shown in FIGS. 6 and 7, the surface of the light blocking metal plate 100 is applied an anodic oxidation treatment and then absorbed an organic dye to realize color. The anodizing treatment, that is, anodizing is performed by immersing the light blocking metal plate 100 as an anode in an aqueous solution of sulfuric acid, nitric acid, or the like, which is an electrolyte, and then flowing an electric current. Then oxygen is generated in the light blocking metal plate 100 by electrolysis, and this oxygen is oxidized to form an oxide film on the surface of the light blocking metal plate 100. This oxide film does not dissolve even when exposed to solution and acid, thus protecting the metal. Further, when the organic dye is adsorbed on the thus formed oxide film, various desired colors can be expressed.

In this anodizing step (S500), since the light blocking metal plate 100 becomes an anode and a current should flow to the letters to be separated, the metal connection between the light blocking metal plate 100 and the letters to be separated should be maintained. Therefore, the grooves are formed so as not penetrate through the light emitting display groove 110 on the upper surface of the light blocking metal plate 100, and after the first resin layer 200 is coupled to the light emitting display groove 110 in a state where the metal connection between the letters to be separated and the light blocking metal plate 100 is maintained, and then the upper surface plane-cutting step (S400) is performed so that the metal surface is exposed on the upper surface of the light blocking metal plate 100.

Figure 10:
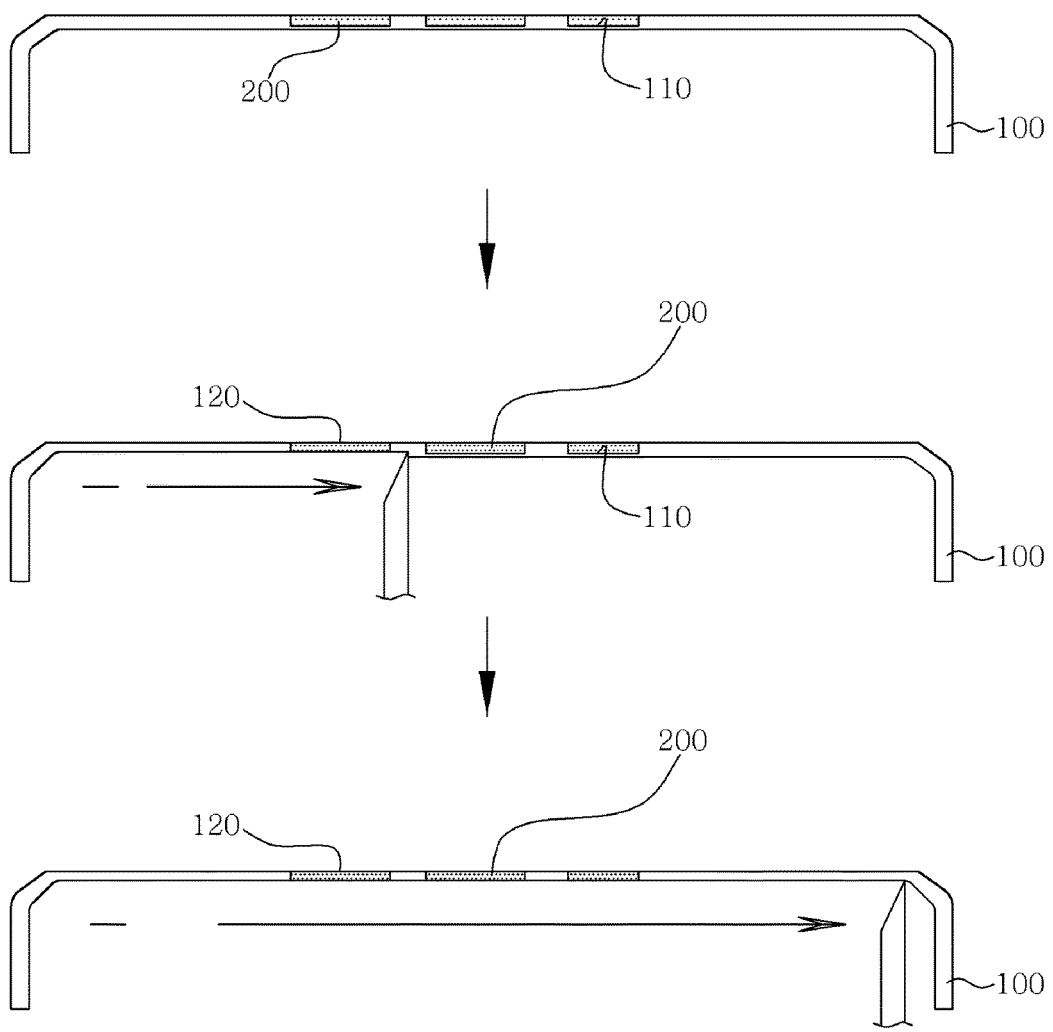
FIG. 10 is a side sectional view of a principal part showing a process for manufacturing a light emitting metal knob at a lower surface plane-cutting step in the embodiment shown in FIG. 7.
Figure 11:
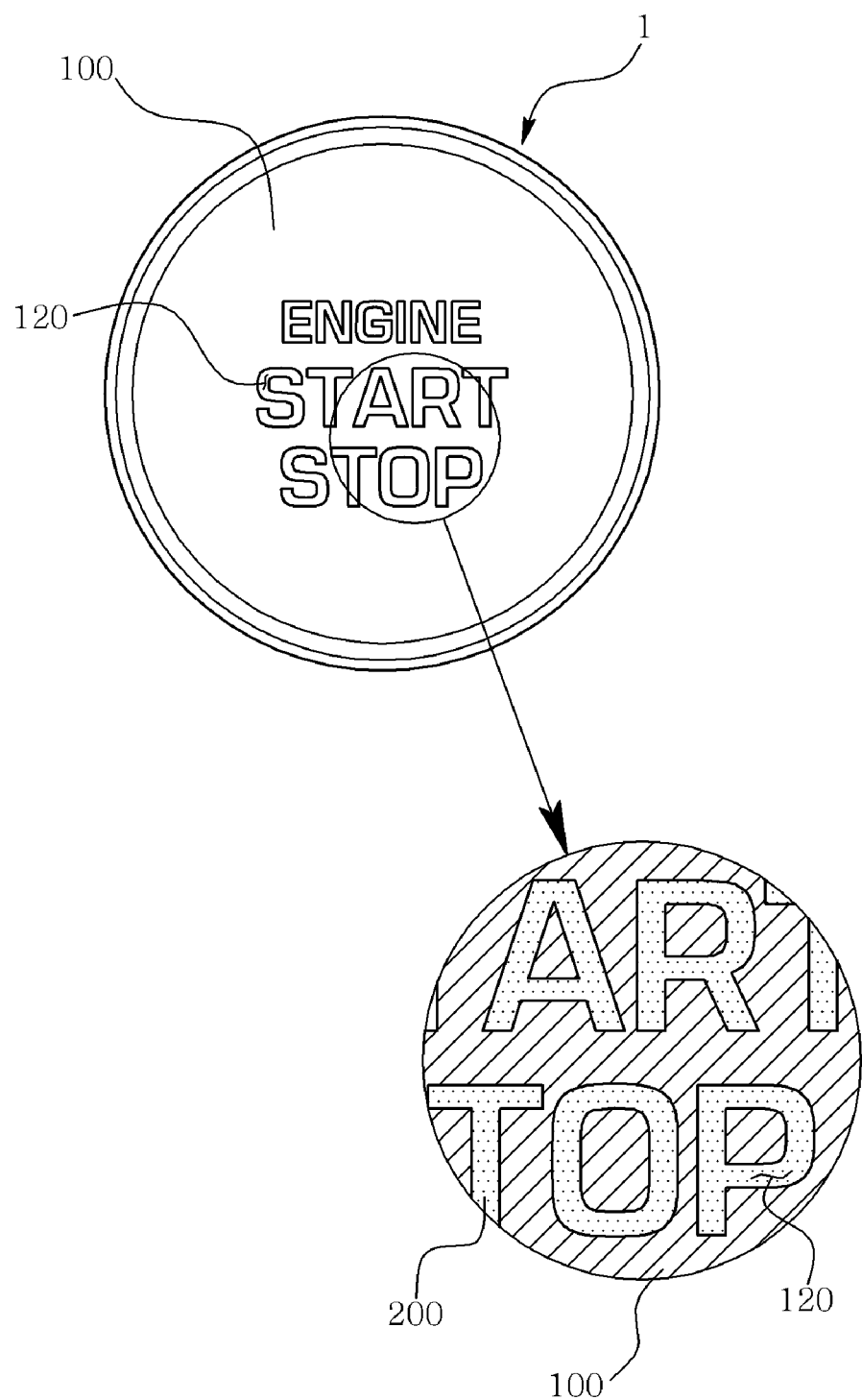
FIG. 11 is a front view showing a light emitting metal knob that is manufactured in accordance with the embodiment shown in FIGS. 6 and 7.

The light emitting display groove 110 of the light blocking metal plate 100 having completed the anodizing process should be changed to the light emitting display window 120 so that the light is transmitted because the entire lower surface is still a metal surface. Therefore, At the lower surface plane-cutting step (S600), as shown in FIGS. 6, 7, and 10, the lower surface of the light blocking metal plate 100 is cut planarly such that the first resin layer 200 coupled into the light emitting display groove 110 is exposed from the lower surface of the light blocking metal plate 100 to form a light emitting display window 120. That is, if the lower surface of the light emitting display groove 110 is blocked by the metal surface of the light blocking metal plate 100, light emitted from the light emitting device 30 cannot emit upward from the light emitting display groove 110. Therefore, when the lower surface of the light blocking metal plate 100 is cut planarly so that the closed lower surface of the light emitting display groove 110 is exposed, the light emitting display groove 110 is completely exposed upward and downward, as a hole or an opened window, so that the light emitting display window 120 is formed.

At this time, if the lower surface plane-cutting step (S600) is performed, the first resin layer 200 is exposed upward and downward so that light can be transmitted through the light emitting display window 120. However, in this case, since the light emitting metal knob 1 is normally formed in a push-button type, a structure capable of supporting the lower surface of the first resin layer 200 is required, and the structure should be made of a light transmitting material.

To do this, At the second resin layer coupling step (S700), as shown in FIGS. 6 and 7, a second resin layer 300, which is made of a light transmitting synthetic resin, is coupled to the lower surface of the light blocking metal plate 100. Since the second resin layer 300 is also a light transmitting synthetic resin, light emitted from the light emitting device 30 can be transmitted to the outside. That is, light emitted from the light emitting device 30 passes through the second resin layer 300 and emits upward from the first resin layer 200. When the second resin layer 300 is coupled to the lower surface of the light blocking metal plate 100, first the second resin layer 300 is formed in advance so that the lower surface of the light blocking metal plate 100 can be inserted, or the second resin layer 300 may be insert injection-molded by using the light blocking metal plate 100 as an insert. The second resin layer 300 may be formed with a bracket, a protrusion, or a protruding groove, though it is not shown in the figure for coupling with another member in a lower portion.

Meanwhile, the surface treatment step (S250) is performed between the display groove forming step (S200) and the first resin layer coupling step (S300) as shown in FIG. 12. At the surface treatment step (S250), the light blocking metal plate 100 is surface-treated to increase a coupling force of the first resin layer 200 to the light blocking metal plate 100. More specifically, as the surface treatment for increasing the coupling force of the first resin layer 200 by injection molding using the light blocking metal plate 100 made of a metal material as an insert, there is a mechanical insertion method by the concave and convex shapes, and the coupling force with the first resin layer 200 can be increased through a chemical treatment such as etching on the light blocking metal plate 100 made of a metal material.

In the present invention, an oxygen-containing film is formed on the surface of the light blocking metal plate 100 in order to maximize the coupling force between the light blocking metal plate 100 made of a metal material and the first resin layer 200, by adding an additive compound having a functional group reactive with the oxygen-containing film, a strong coupling force between the two dissimilar materials can be obtained. That is, at the surface treatment step (S250), the surface of the light blocking metal plate 100 is treated to increase the oxygen content to form the oxygen-containing film containing oxygen. At this time, at the first resin layer coupling step (S300), the first resin layer 200 contains an additive compound having a functional group that reacts with the oxygen-containing film as a thermoplastic resin composition, wherein the additive compound is selected from the group consisting of a carboxyl group, a salt thereof and ester thereof, an epoxy group, a glycidyl group, an isocyanate group, a carbodiimide group, an amino group and a salt thereof, an acid anhydride group and an ester thereof.

At the surface treatment step (S250), the method of forming the oxygen-containing film on the surface of the light blocking metal plate 100 by increasing the oxygen content is as follows. First, the light blocking metal plate 100 is immersed in an aqueous zinc-ion-containing sodium solution to form a zinc-containing film, and thereafter, the zinc-containing film containing zinc element as the oxygen-containing film on the surface is formed. Second and third, the surface of the light blocking metal plate 100 is formed a hydrated oxide film by the hot water or warm water. Fourth, an oxide film is formed on the surface of the light blocking metal plate 100 by laser.

The light blocking metal plate 100, which has been surface-treated so as to form the oxygen-containing film, is used as an insert, and as the thermoplastic resin composition, the first resin layer 200 containing the additive compound having the functional group reactive with the oxygen-containing film is injection-molded so that a strong and firm coupling force can be obtained.

Meanwhile, in order to make the surface of the light blocking metal plate 100 clean and smooth before performing the anodizing step (S500), a sandblasting step (S450) may be performed as shown in FIG. 12. That is, the sandblasting step (S450) is performed between the upper surface plane-cutting step (S400) and the anodizing step (S500), and the surface of the light blocking metal plate 100 is sandblasted to make the surface smooth. The sandblasting is effective in removing the dirt, oil, and other impurities by mixing the sand with high-pressure water and spraying the sand on the surface of the light blocking metal plate 100 to enhance the strength and surface quality. In particular, since the surface roughness of the light blocking metal plate 100 is very poor after the upper surface plane-cutting step (S400)

is performed, the sandblasting step (S450) is performed before the anodizing step (S500) to smooth the surface roughness.

Figure 14:
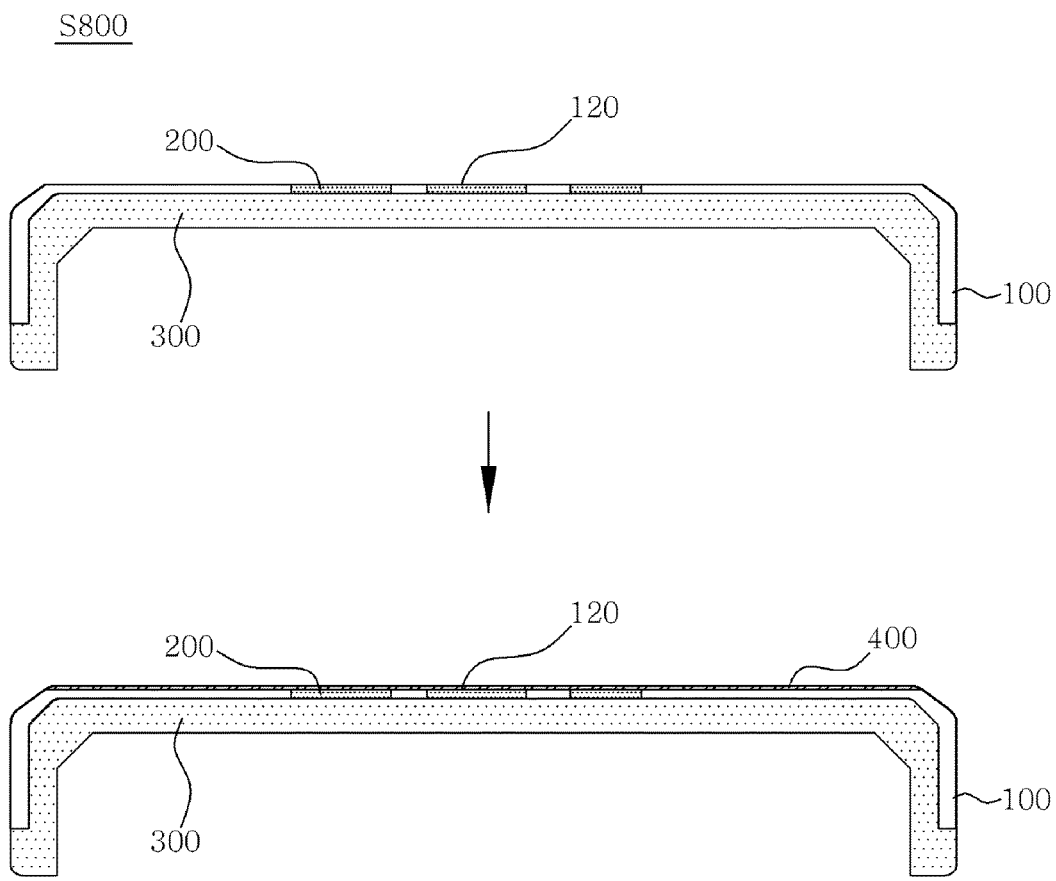
FIG. 14 is a side sectional view of a principal part showing a process for manufacturing a light emitting metal knob at a coating step in the embodiment shown in FIG. 13.

At the coating step (S800), as shown in FIGS. 13 and 14, the upper surface of the light blocking metal plate 100 is coated. Coating includes putting a thin film of paraffin, rubber resin, or a chemical material on the surface of a material. In the present invention, the surface of the light blocking metal plate 100 is coated with hard urethane 400. In a case in which liquid urethane is mixed with a pigment having various colors, the hard urethane 400 is formed in a semi-transparent state. The upper surface of the light blocking metal plate 100 is coated with the hard urethane 400, and is then dried. As a result, it is possible to improve the visibility of light emitted through the light emitting display window 120. In addition, in a case in which the light blocking metal plate 100 is coated with the hard urethane 400, it is possible to avoid leaving fingerprints on the upper surface of the light blocking metal plate 100 and to provide the light blocking metal plate 100 with an aesthetically pleasing appearance.

As described above, in the method for manufacturing a light emitting metal knob according to the present invention has the following effects.

First, the light emitting display groove 110 is formed on the upper surface of the light blocking metal plate at the display groove forming step (S200), and then the first resin layer 200 is filled in the light emitting display groove 110 at the first resin layer coupling step (S300) and the upper surface plane-cutting step (S400), the letters to be separated from the light blocking metal plate 100 is maintained in a state where the lower surface and the side surface are firmly coupled by the first resin layer 200 and the second resin layer 300 through the lower surface plane-cutting step (S600) and the second resin layer coupling step (S700), thereby considerably reducing a defect rate.

Second, the first resin layer 200 is coupled to the light emitting display groove 110 through the upper surface plane-cutting step (S400) after the display groove forming step (S200) and the first resin layer coupling step (S300), since the metal connection between the light blocking metal plate 100 and the letters to be separated is maintained, thereby the color of the surface can be realized even the letters to be separated from the light blocking metal plate 100 when the anodizing processing.

Third, an oxygen-containing film is formed on the surface of the light blocking metal plate 100 through the surface treatment step (S250) and an additive compound having a functional group reactive with the oxygen-containing film is contained in the first resin layer 200 at the first resin layer coupling step (S300), thereby a strong coupling force between the two dissimilar materials can be obtained and there is an effect of preventing the first resin layer 200 from being separated from the light blocking metal plate 100 together with the letters to be separated.

It must not be interpreted that the preferred embodiments of the present invention, which have been described above and shown in the drawings, define the technical idea of the present invention. The scope of protection of the present invention is limited by what is claimed in the claims, and various modifications and variations of the technical idea of the present invention can be made by those skilled in the art to which the present invention pertains. Therefore, such modifications and variations will fall into the scope of protection of the present invention as far as they are obvious to those skilled in the art.

What is claimed is:

1. A method for manufacturing a light emitting metal knob comprising:
   a metal plate processing step of forming a light blocking metal plate in a cap shape including an upper plate portion and a side plate portion;
   a display groove forming step of forming a light emitting display groove in an upper surface of the upper plate portion of the light blocking metal plate;
   a first resin layer coupling step of coupling a first resin layer, which is made of a light transmitting synthetic resin, to the upper surface of the upper plate portion of the light blocking metal plate so as to fill the light emitting display groove;
   an upper surface plane-cutting step of cutting the upper surface of the upper plate portion of the light blocking metal plate such that the first resin layer filled in the light emitting display groove is remained;
   an anodizing step of applying an anodic oxidation treatment to the light blocking metal plate and then applying an organic dye to realize a color;
   a lower surface plane-cutting step of cutting a lower surface of the upper plate portion of the light blocking metal plate such that the first resin layer coupled into the light emitting display groove is exposed from the lower surface of the upper plate portion of the light blocking metal plate to form a light emitting display window; and
   a second resin layer coupling step of coupling a second resin layer, which is made of a light transmitting synthetic resin, to the lower surface of the upper plate portion of the light blocking metal plate.

2. The method according to claim 1, wherein the metal plate processing step comprises processing a plate-shaped metal material by pressing to manufacture the cap shaped light blocking metal plate.

3. The method according to claim 1, further comprising a surface treatment step performing between the display groove forming step and the first resin layer coupling step, to surface-treat the light blocking metal plate to increase a coupling force of the first resin layer to the light blocking metal plate.

4. The method according to claim 3, wherein the surface treatment step comprises treating a surface of the light blocking metal plate to increase the oxygen content to form an oxygen-containing film containing oxygen; and wherein, in the first resin layer coupling step, the first resin layer contains an additive compound having a functional group that reacts with the oxygen-containing film as a thermoplastic resin composition, and the additive compound is selected from the group consisting of a carboxyl group, a salt thereof and ester thereof, an epoxy group, a glycidyl group, an isocyanate group, a carbodiimide group, an amino group and a salt thereof, an acid anhydride group and an ester thereof.

5. The method according to claim 1, further comprising a sandblasting step performing between the upper surface plane-cutting step and the anodizing step, to sandblast a surface of the light blocking metal plate to make the surface clean.

6. The method according to claim 1, wherein, at the first resin layer coupling step, the first resin layer is bonded to the upper surface of the upper plate portion of the light blocking metal plate or the first resin layer is injection molded by using the light blocking metal plate as an insert.

7. The method according to claim 1, wherein, at the second resin layer coupling step, the second resin layer is bonded to the lower surface of the upper plate portion of the light blocking metal plate or the first resin layer is injection molded by using the light blocking metal plate as an insert.

8. The method according to claim 1, further comprising a coating step of coating the upper surface of the upper plate portion of the light blocking metal plate.

9. The method according to claim 8, wherein, at the coating step, the upper surface of the upper plate portion of the light blocking metal plate is coated with hard urethane.

* * * * *